Nov. 3, 1953 W. A. BEDFORD, JR 2,657,442
MOUNTING CLIP
Filed Oct. 23, 1948

Inventor
WILLIAM A. BEDFORD JR.
By Philip E. Parker
Attorney

Patented Nov. 3, 1953

2,657,442

UNITED STATES PATENT OFFICE 2,657,442

MOUNTING CLIP

William A. Bedford, Jr., North Scituate, Mass., assignor to United-Carr Fastener Corporation, Cambridge, Mass., a corporation of Massachusetts Application October 23, 1948, Serial No. 56,153

1 Claim. (Cl. 24—81)

The present invention relates to fastener clips and the like such as those intended for attaching cables, tubing, conductors and like objects to a supporting structure, and aims generally to improve existing devices of this type.

A primary object of the present invention is the provision of a universal fastener clip adapted to secure cylindrical objects varying in diameters throughout a relatively wide range to supports varying in thickness throughout a relatively wide range.

A further object of the invention is the provision of a fastener clip having novel support-engaging and gripping means adapted to be attached to supports of varying thickness throughout a relatively wide range, as for example from .030 to .250 inch, and to be securely held thereon against accidental displacement therefrom.

A still further object of the invention is the provision of an improved fastener clip adapted to securely clamp and grip a tubing, conductor or like object varying in diameter throughout a relatively wide range, as for example from $\frac{3}{16}$ inch to $\frac{7}{16}$ inch.

The above and other objects and advantages of the invention will be apparent to persons skilled in the art to which the invention relates from a consideration of the accompanying drawings and annexed specification illustrating and describing a preferred embodiment of the invention.

In the drawings—

Figure 1:
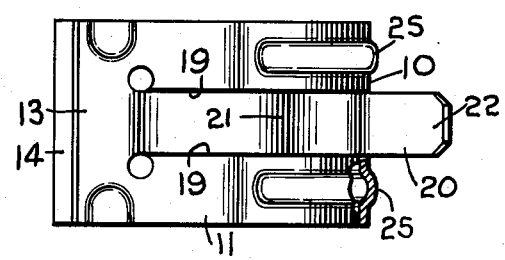
Fig. 1 is a plan view of the improved fastener clip according to the present invention.
Figure 2:
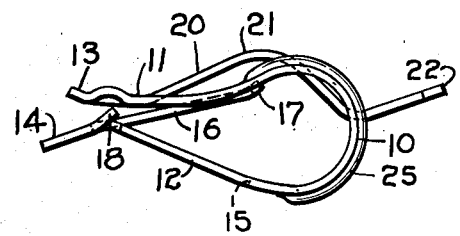
Fig. 2 is a side elevational view thereof.
Figure 3:
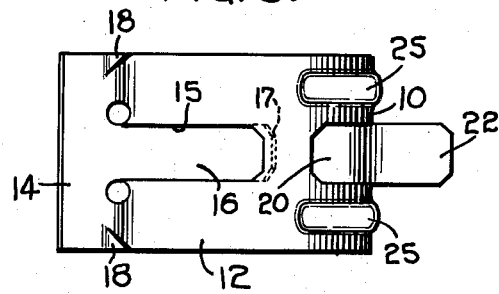
Fig. 3 is a bottom view of the clip shown in Figs. 1 and 2.

Referring to the drawings, the improved fastener clip is advantageously made from a single strip of resilient sheet material, for example spring steel, and shaped to provide a central bight portion 10 and terminal leg portions 11 and 12 adapted to be positioned on opposite sides of a support S to which the clip is to be attached. The central bight portion 10 is of a diameter greater than the thickness of the thickest support and preferably comprises an arc of more than 180 degrees but less than 270 degrees. The lower leg 12 may extend tangentially from the bight portion 10, and the upper leg portion preferably extends chordally from the upper part of the bight portion, as shown in Fig. 2, and overlies the leg portion 12, the two leg portions 11 and 12 converging toward their terminal ends which may be flared outwardly as at 13 and 14, respectively to facilitate slipping the clip over an edge of the support S.

Figure 4:
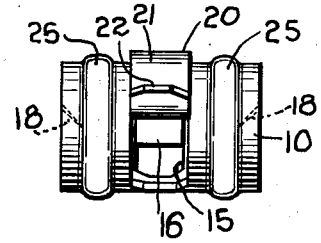
Fig. 4 is an end view thereof.

The lower leg portion 12 is provided with a U-shaped slit 15 (Fig. 4) to provide a support-gripping tongue 16 between the sides of the slit 15, integrally joined to the leg portion 12 adjacent the terminal end 14, and extending toward the bight portion. It constitutes an extension of the end portion 14 and is movable relative to leg portion 12 so as to assume a position substantially flat against an adjacent face of a support S regardless of the angle of inclination of the leg portion 12 with respect thereto. The terminal end 17 of the tongue 16 may be upwardly turned to grip the support S and the leg portion 12 may be additionally provided with support-engaging prongs 18 to additionally grip the support.

Figure 5:
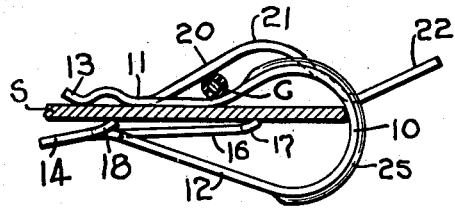
Fig. 5 is a longitudinal sectional view of the clip as applied to a thin support and illustrating a small diameter conductor retained thereby.
Figure 6:
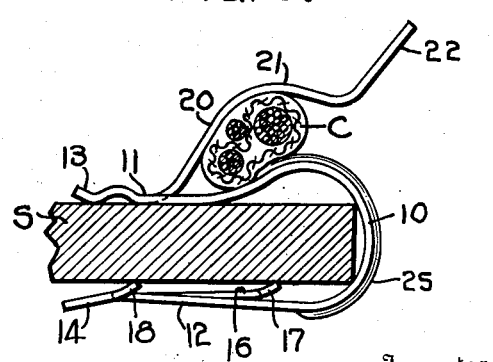
Fig. 6 is a view similar to Fig. 5 showing the clip as applied to a relatively thick support and gripping a large diameter conductor.

The bight portion 10 and upper leg portion 11 are circumferentially and longitudinally slitted as at 19 to provide material for an article-gripping tongue 20 integrally joined to the leg portions 11 adjacent the flared end 13 and extending toward the bight portion 10. This tongue 20 may be provided with an outwardly extending bend 21 providing a pocket for receiving and holding a conductor or like article C against the upper leg portion 11. The terminal end portion of the tongue 19 may be bent outwardly to provide a handle or finger-engaging means 22 by means of which the tongue 20 may be separated from the leg portion 11 to facilitate insertion of the conductor or article C. Preferably, the radius of curvature of the outwardly bent portion 20 is as great as the radius of the largest diameter conductor to be fastened. As a portion of the tongue 20 is disposed in the slot 19, conductors of small diameter will be effectively gripped thereby, as illustrated in Fig. 5.

It is desirable that the support S be gripped by the upper leg portion 11 and the support-engaging tongue 16 of the lower leg portion under maximum pressure, provided by the bight portion 10. As the bight portion is slotted to provide the article-gripping tongue, it is weakened and additional stiffness may be provided by stiffening ribs 25 peripherally of the bight portion 10 and disposed on opposite sides of the slot 19.

As will be apparent from a comparison of Figs.

5 and 6, the fastener clip of the present invention is adapted to grip and hold conductors and like articles of a wide variety of sizes and diameter and the clip may be securely fastened to supports of various thicknesses while maintaining a uniform secure clamping action of the upper leg portion 11 and support-gripping tongue 16 with opposite faces of the support.

Although I have illustrated and described a preferred embodiment of my invention, I do not intend to be restricted thereto as the scope of the invention is best defined in the appended claim.

I claim:

A fastener clip for securing conductors and the like on the end of a flat support comprising, a strip of resilient sheet spring material provided with an intermediate arcuate bight portion of more than 180 degrees and less than 270 degrees in circumferential extent, terminal leg portions extending from the ends of the bight in the same direction adapted to be disposed on opposite sides of a support to which said clip may be applied, one of said leg portions extending tangentially from said arcuate bight portion and having an integral support-engaging tongue extending from the end of the leg toward the bight portion and spring biased toward the other of the leg portions, the opposing leg portion extending from the bight portion along a choral line and overlying said first leg portion, a curved portion intermediate the second leg and the bight providing a concave article-receiving surface, said second leg portion and said bight portion being slotted for a substantial length intermediate the width thereof to provide an article gripping tongue integral with the second leg portion and joined to the leg adjacent the end thereof, the last said tongue extending toward said bight portion and having an article receiving bight intermediate its ends opposite said article receiving concave surface and opening toward said surface for cooperation therewith to receive and hold a conductor and the like, said leg portions being disposed in acute angular relation when in engagement with opposite sides of a thin support and in substantially parallel relation when in engagement with opposite sides of a substantially thick support.

WILLIAM A. BEDFORD, JR.

References Cited in the file of this patent

UNITED STATES PATENTS

| Number | Name | Date |
|---|---|---|
| 1,744,106 | Ames | Jan. 21, 1930 |
| 2,109,213 | Fearing | Feb. 22, 1938 |
| 2,187,321 | Johnson | Jan. 16, 1940 |
| 2,456,553 | Churchill | Dec. 14, 1948 |
| 2,459,307 | Churchill | Jan. 18, 1949 |
| 2,485,189 | Churchill | Oct. 18, 1949 |
| 2,511,801 | Churchill | June 13, 1950 |